US011507518B2

(12) United States Patent
Cariello et al.

(10) Patent No.: US 11,507,518 B2
(45) Date of Patent: Nov. 22, 2022

(54) LOGICAL-TO-PHYSICAL MAPPING USING A FLAG TO INDICATE WHETHER A MAPPING ENTRY POINTS TO [[FOR]] SEQUENTIALLY STORED DATA

(71) Applicant: Micron Technology, Inc., Boise, ID (US)

(72) Inventors: Giuseppe Cariello, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/870,674

(22) Filed: May 8, 2020

(65) Prior Publication Data

US 2021/0349829 A1 Nov. 11, 2021

(51) Int. Cl.
*G06F 12/1009* (2016.01)
(52) U.S. Cl.
CPC .... *G06F 12/1009* (2013.01); *G06F 2212/651* (2013.01); *G06F 2212/7201* (2013.01)
(58) Field of Classification Search
CPC ....... G06F 2212/7201; G06F 2212/651; G06F 12/1009
See application file for complete search history.

(56) References Cited

U.S. PATENT DOCUMENTS

| 2009/0292899 | A1* | 11/2009 | Mansell | G06F 12/1009 711/207 |
| 2012/0072644 | A1* | 3/2012 | Asano | G06F 12/0246 711/103 |
| 2016/0283396 | A1* | 9/2016 | Ter-Grigoryan | G06F 12/1009 |
| 2019/0220416 | A1* | 7/2019 | Jung | G06F 12/1009 |

* cited by examiner

*Primary Examiner* — Chie Yew
(74) *Attorney, Agent, or Firm* — Holland & Hart LLP

(57) ABSTRACT

Methods, systems, and devices for compressed logical-to-physical mapping for sequentially stored data are described. A memory device may use a hierarchical set of logical-to-physical mapping tables for mapping logical block address generated by a host device to physical addresses of the memory device. The memory device may determine whether all of the entries of a terminal logical-to-physical mapping table are consecutive physical addresses. In response to determining that all of the entries contain consecutive physical addresses, the memory device may store a starting physical address of the consecutive physical addresses as an entry in a higher-level table along with a flag indicating that the entry points directly to data in the memory device rather than pointing to a terminal logical-to-physical mapping table. The memory device may, for subsequent reads of data stored in one or more of the consecutive physical addresses, bypass the terminal table to read the data.

22 Claims, 9 Drawing Sheets

LOGICAL-TO-PHYSICAL MAPPING USING A FLAG TO INDICATE WHETHER A MAPPING ENTRY POINTS TO [[FOR]] SEQUENTIALLY STORED DATA

BACKGROUND

The following relates generally to one or more memory systems and more specifically to compressed logical-to-physical mapping for sequentially stored data.

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often denoted by a logic 1 or a logic 0. To access the stored information, a component may read, or sense, at least one stored state in the memory device. To store information, a component may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), Flash memory (such as floating-gate Flash and charge-trapping Flash, which may be used in not-or (NOR) or not-and (NAND) memory devices), and others. Memory devices may be volatile or non-volatile. Non-volatile memory cells, such as flash memory cells, may maintain their stored logic state for extended periods of time even in the absence of an external power source. Volatile memory cells, such as DRAM cells, may lose their stored state over time unless they are periodically refreshed by an external power source. Flash-based memory devices may have different performance compared to other non-volatile and volatile memory devices.

DETAILED DESCRIPTION

Figure 1:
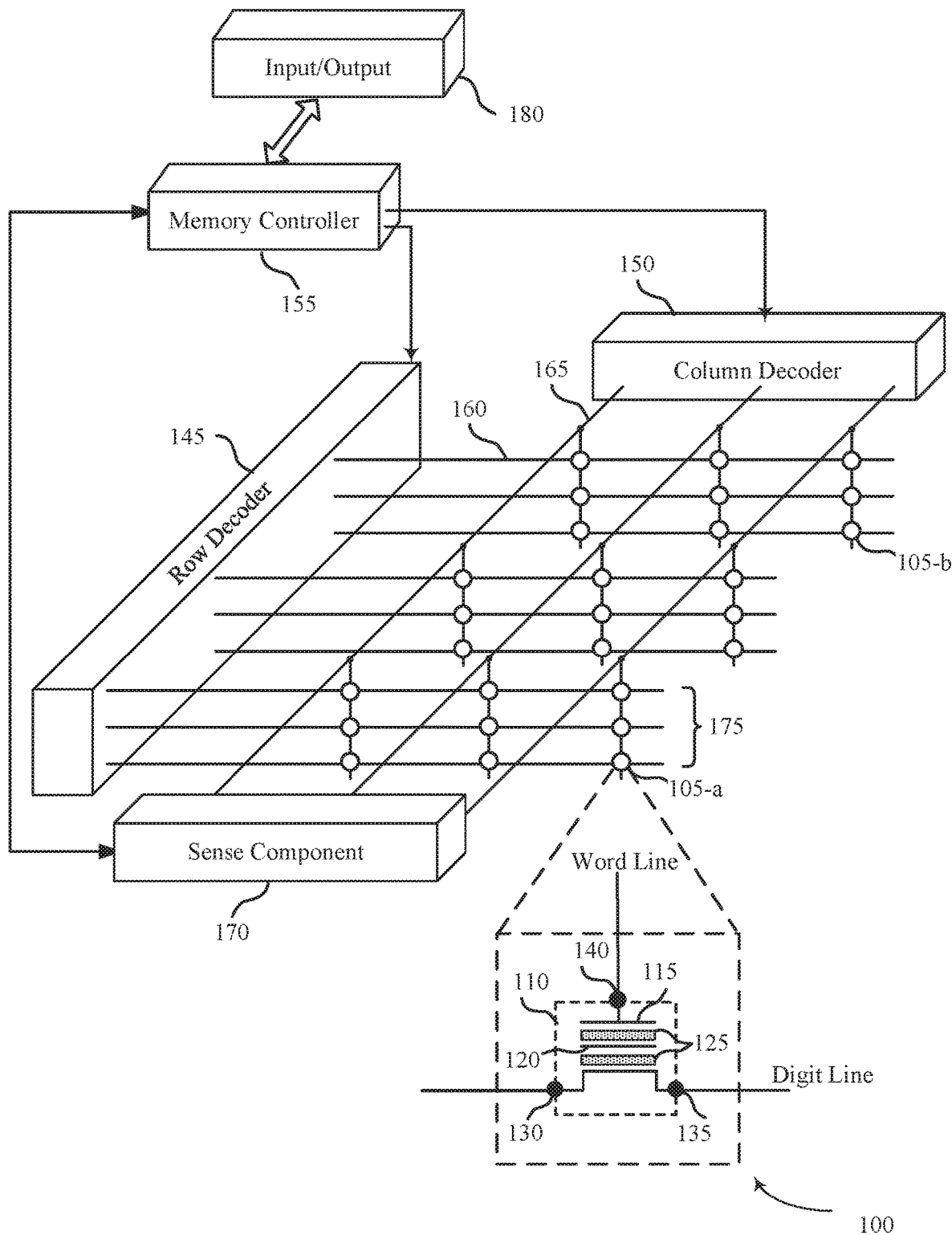
FIG. 1 illustrates an example of a memory device that supports compressed logical-to-physical mapping for sequentially stored data in accordance with examples as disclosed herein.

A memory device, such as a device that includes Flash memory, among other examples, may be coupled with a host device and may receive commands, such as read and write commands for reading or writing data, from the host device. Flash memory is generally organized into pages and blocks, where each block may contain multiple pages. Flash memory cells may be read and written at a page level, but may be erased at a block level. In some examples, Flash memory cells may not be re-written without being erased first. Thus, when a Flash memory device updates a page of data (e.g., in response to a command from the host device), the memory device may write the new data to a different page and mark the old page as obsolete rather than erasing a block of memory and re-writing any valid pages in the block.

For a write operation, the host device may refer to the location of data stored in the memory device using a logical block address (LBA) to identify a logical (e.g., conceptual) location of a page of data. The LBA may be mapped to a physical address of a page of memory of the memory device at which the data is stored. Because the physical address of the data may change (e.g., when data is updated by writing the updated data to a different page), some memory devices maintain one or more logical-to-physical (L2P) tables that map LBAs generated by the host device to corresponding physical addresses of pages in the memory device. In this manner, the host device can request to read data from the memory device using a same LBA as was used for writing the data even if the data has been moved to a different physical address. In some examples, a physical address may include an offset index that indicates a specific subset of the page. For example, if a memory device has a page size of 16 kB, each page may be further partitioned into four 4 kB subsets of pages that may be accessed based on the offset index of the physical address.

Memory devices with relatively large storage capacities may use a hierarchical L2P table architecture with multiple levels of tables to identify the location of a page of data to be read, such as a two-level architecture or three-level architecture. The memory device may, in some examples use the multi-level L2P tables to progressively home in on the location of the page of data in the Flash memory. For example, a three-level L2P table architecture may include a relatively small first-level table that may include a list of physical addresses that point to the locations of multiple second-level L2P tables. The second-level L2P tables may include a list of physical addresses that point to the locations of multiple third-level L2P tables. The third-level L2P tables may include a list of physical addresses that point to pages of data in Flash memory; for examples, they may be the terminal (e.g., last) tables in the hierarchy. Thus, to access the data in the Flash memory, a memory device may navigate through the three levels to identify the location of a requested page of data. Such an approach may allow for a relatively small first-level L2P table to be stored in SRAM on the memory device for fast accesses and updates, but may increase read latency by introducing additional operations, such as two additional reads (e.g., for reading entries in the first-level table and second-level table) to identify the physical address of the data.

Third-level tables may include a list of physical addresses that may be ordered by a corresponding LBA index. That is, a first entry in a third-level table may include a physical address corresponding to LBA 0, a second entry may include a physical address corresponding to LBA 1, etc. The physical addresses may not be sequential in all cases. However, when host data is written to the Flash memory sequentially (e.g., data is written to sequential physical addresses), the physical addresses in a third-level L2P table may also be sequential, like the corresponding LBAs. Such sequential writes may be faster than non-sequential writes, and may occur when data is downloaded or streamed, for example.

In some examples, third-level L2P tables may contain between 512 bytes and 4 kB of physical addresses (depending on the architecture), thus mapping between 2 and 16 MB of user data in Flash memory.

In some examples, if the pages of data of a third-level table are sequentially stored (e.g., the physical addresses in the table are sequential), the pages of data mapped by the third-level table may subsequently be read based on a first physical address of the third-level table, for example, a starting physical address corresponding to the first LBA of the table. For example, a memory device may calculate the physical address of any page of the pages of sequentially stored data based on the first physical address, or may read multiple sequential pages of data starting from the first physical address. Such sequentially stored data may be an example of or be referred to as a stream of data.

As described herein, the starting physical address of the sequentially stored data may be stored as an entry in a second-level L2P table (e.g., rather than the entry storing a pointer to a third-level L2P table) and may point directly to the sequential data. In this example, the memory device may locate the data by traversing the first two levels of L2P tables without accessing a third-level L2P table, thereby eliminating one of the L2P table reads and improving read latency, among other advantages.

In some examples, a second-level L2P may include some entries that point to a physical address of sequential user data (e.g., bypassing the need for the third-level L2P table), and other entries that include pointers to third-level L2P tables (e.g., for non-sequentially stored data). In some examples, it may be beneficial to provide an indication, to the memory device, in each entry about which of these two types of entries is included in the second-level L2P entry to enable the memory device to accurately locate the user data and bypass the third-level L2P table when possible.

In some examples, each entry (e.g., pointer) in an L2P table may occupy 4 bytes (for computing ease), and may point to up to 16 TB of Flash memory (with 4 kB memory blocks). In memory devices with smaller capacity (e.g., up to 512 GB), some bits in each entry may not be used for L2P mapping. Any available bits of each entry may instead be used to store extra information, such as whether the physical address is valid or not. In some examples, one or more such available bits may be used to indicate, to the memory device, whether the L2P entry includes a pointer to a third-level L2P table or a pointer to the user data, among other examples.

Techniques described herein may offer several benefits. For example, random read performance may be improved by calculating a physical address of a page of data in the sequential data based on an offset from the first LBA starting physical address to eliminate the terminal L2P table lookup. Moreover, terminal L2P table updates may be eliminated, resulting in more free space in the NAND Flash memory (e.g., third-level L2P tables may consume hundreds of MB) and less wear on the NAND memory cells for performing unnecessary operations.

To optimize read levels, a memory device may store temperature and time codes starting from when the program operation (e.g., write operation) occurred for each page or LBA in a NAND Flash memory. By using an indicator in the second-level L2P table for denoting sequential data, when the whole block (e.g., the whole terminal L2P table) is filled, the dedicated SRAM table can be compressed and skip the temperature and time stamp for each page in the block, since the sequential writes are done atomically.

Features of the disclosure are initially described in the context of a memory device and NAND circuit as described with reference to FIGS. 1 and 2. Features of the disclosure are further described in the context of systems, processes, and flows for generating and using entries in L2P tables for sequentially stored data, as described with reference to FIGS. 3-6. These and other features of the disclosure are further illustrated by and described with reference to an apparatus diagram and flowcharts that relate to compressed logical-to-physical mapping for sequentially stored data as described with reference to FIGS. 7-9.

FIG. 1 illustrates an example of a memory device 100 in accordance with examples as disclosed herein. In some examples, the memory device 100 may be referred to as (or may be included in) a managed memory device, a universal flash storage (UFS) device, a solid-state storage device, a memory chip, or an electronic device, or an apparatus. The memory device 100 may include one or more memory cells, such as memory cell 105-*a* and memory cell 105-*b* (other memory cells are unlabeled). A memory cell 105 may be, for example, a Flash memory cell (such as depicted in the blow-up diagram of memory cell 105-*a* shown in FIG. 1), a DRAM memory cell, an FeRAM memory cell, a PCM memory cell, or another type of memory cell.

Each memory cell 105 may be programmed to store a logic state representing one or more bits of information. Different memory cell architectures may store a logic state in different ways. In FeRAM architectures, for example, each memory cell 105 may include a capacitor that includes a ferroelectric material to store a charge and/or a polarization representative of the programmable state. In DRAM architectures, each memory cell 105 may include a capacitor that includes a dielectric material (e.g., an insulator) to store a charge representative of the programmable state. In Flash memory architectures, each memory cell 105 may include a transistor that has a floating gate and/or a dielectric material for storing a charge representative of the logic state. For example, the blow-up diagram of memory cell 105-*a* is a Flash memory cell that includes a transistor 110 (e.g., a metal-oxide-semiconductor (MOS) transistor) that may be used to store a logic state. The transistor 110 has a control gate 115 and may include a floating gate 120 that is sandwiched between dielectric material 125. Transistor 110 includes a first node 130 (e.g., a source or drain) and a second node 135 (e.g., a drain or source). A logic state may be stored in transistor 110 by placing (e.g., writing, storing) a quantity of electrons (e.g., a charge) on floating gate 120. The amount of charge to be stored on the floating gate 120 may depend on the logic state to be stored. The charge stored on floating gate 120 may affect the threshold voltage of transistor 110, thereby affecting the amount of current that may flow through transistor 110 when transistor 110 is activated. The logic state stored in transistor 110 may be read by applying a voltage to the control gate 115 (e.g., at control node 140) to activate transistor 110 and measuring (e.g., detecting, sensing) the resulting amount of current that flows between the first node 130 and the second node 135.

For example, a sense component 170 may determine a logic state stored on a Flash memory cell based on the presence or absence of a current from the memory cell, or based on whether the current is above or below a threshold current. Similarly, a Flash memory cell may be written by applying a voltage (e.g., a voltage above a threshold or a voltage below a threshold) to the memory cell to store (or not store) an electric charge on the floating gate representing one of the possible logic states.

A charge-trapping Flash memory cell may operate in a manner similar to that of a floating-gate Flash memory cell, but instead of (or in addition to) storing a charge on a floating gate 120, a charge-trapping Flash memory cell may store a charge representing the state in a dielectric material below the control gate 115. Thus, a charge-trapping Flash memory cell may or may not include a floating gate 120.

In some examples, each row of memory cells 105 is connected to a word line 160 and each column of memory cells 105 is connected to a digit line 165. Thus, one memory cell 105 may be located at the intersection of a word line 160 and a digit line 165. This intersection may be referred to as a memory cell's address. Digit lines are sometimes referred to as bit lines. In some examples, word lines 160 and digit lines 165 may be substantially perpendicular to one another and may create an array of memory cells 105 (e.g., in a memory array). In some examples, word lines 160 and digit lines 165 may be generically referred to as access lines or select lines.

In some examples, memory device 100 may include a three-dimensional (3D) memory array, where multiple two-dimensional (1D) memory arrays are formed on top of one another. This may increase the quantity of memory cells that may be placed or created on a single die or substrate as compared with 1D arrays, which in turn may reduce production costs, or increase the performance of the memory array, or both. In the example of FIG. 1, memory device 100 includes multiple levels of memory arrays. The levels may, in some examples, be separated by an electrically insulating material. Each level may be aligned or positioned so that memory cells 105 may be aligned (exactly, overlapping, or approximately) with one another across each level, forming a memory cell stack 175. In some examples, memory cell stack 175 may be referred to as a string of memory cells, discussed in more detail with reference to FIG. 3.

Accessing memory cells 105 may be controlled through row decoder 145 and column decoder 150. For example, row decoder 145 may receive a row address from memory controller 155 (e.g., a control component) and activate an appropriate word line 160 based on the received row address. Similarly, column decoder 150 may receive a column address from memory controller 155 and activate an appropriate digit line 165. Thus, by activating one word line 160 and one digit line 165, one memory cell 105 may be accessed.

Upon accessing, memory cell 105 may be read, or sensed, by sense component 170. For example, sense component 170 may be configured to determine the stored logic state of memory cell 105 based on a signal generated by accessing memory cell 105. The signal may include a voltage or electrical current, or both, and sense component 170 may include voltage sense amplifiers, current sense amplifiers, or both. For example, a current or voltage may be applied to a memory cell 105 (using the corresponding word line 160 and/or digit line 165) and the magnitude of the resulting current or voltage on the digit line 165 may depend on the logic state stored by the memory cell 105. For example, for a Flash memory cell, the amount of charge stored on a floating gate or in an insulating layer of a transistor in the memory cell 105 may affect the threshold voltage of the transistor, thereby affecting the amount of current that flows through the transistor in the memory cell 105 when the memory cell 105 is accessed. Such differences in current may be used to determine the logic state stored on the memory cell 105.

Sense component 170 may include various transistors or amplifiers in order to detect and amplify a signal (e.g., a current or voltage) on a digit line 165. The detected logic state of memory cell 105 may then be output via input/output block 180. In some examples, sense component 170 may be a part of column decoder 150 or row decoder 145, or sense component 170 may otherwise be connected to or in electronic communication with column decoder 150 or row decoder 145.

A memory cell 105 may be set or written by similarly activating the relevant word line 160 and digit line 165 to enable a logic state (e.g., representing one or more bits of information) to be stored in the memory cell 105. Column decoder 150 or row decoder 145 may accept data, for example from input/output block 180, to be written to the memory cells 105. As previously discussed, in the case of Flash memory (such as Flash memory used in NAND and 3D NAND memory devices) a memory cell 105 may be written by storing electrons in a floating gate or an insulating layer.

Memory controller 155 may control the operation (e.g., read, write, re-write, refresh) of memory cells 105 through the various components, for example, row decoder 145, column decoder 150, and sense component 170. In some examples, one or more of row decoder 145, column decoder 150, and sense component 170 may be co-located with memory controller 155. Memory controller 155 may generate row and column address signals in order to activate the desired word line 160 and digit line 165. Memory controller 155 may also generate and control various voltages or currents used during the operation of memory device 100. In some examples, memory controller 155 or another component of memory device 100 may construct (e.g., build, generate, and/or maintain) one or more L2P tables for mapping LBAs, for example LBAs generated by a host device, to physical addresses in the memory device 100 (e.g., addresses of physical pages in memory device 100 that correspond to the LBAs). In some examples, memory device 100 may generate and/or maintain multiple levels of L2P tables, such as in a three-level L2P table architecture. In some examples, memory device 100 may determine whether a terminal L2P table (such as a third-level L2P table) is filled with (or would be filled with) sequential physical addresses, such as when data is sequentially written to the memory device. In this case, memory device 100 may store a first physical address of the sequential physical addresses in an entry of a higher-level L2P table (e.g., a second-level L2P table), and may discard (or refrain from generating) the terminal L2P table (e.g., a third-level L2P table). Memory device 100 may store, in one or more entries of the higher-level L2P table (e.g., a second-level L2P table), an indication, such as a value of a flag, of whether the entry includes a pointer directly to sequential physical data, thereby enabling the memory device 100 to bypass the terminal L2P table (e.g., a third-level L2P table), or a pointer to the terminal L2P table.

Although the discussion herein focuses on a three-level L2P table architecture, a similar approach may be used in other examples of multi-level L2P table architectures, such as a two-level L2P architecture, a four-level L2P architecture, etc., in which the terminal (e.g., last) L2P table may be eliminated (e.g., discarded, not generated, bypassed) if the data pointed to by the table is sequentially stored.

Figure 2:
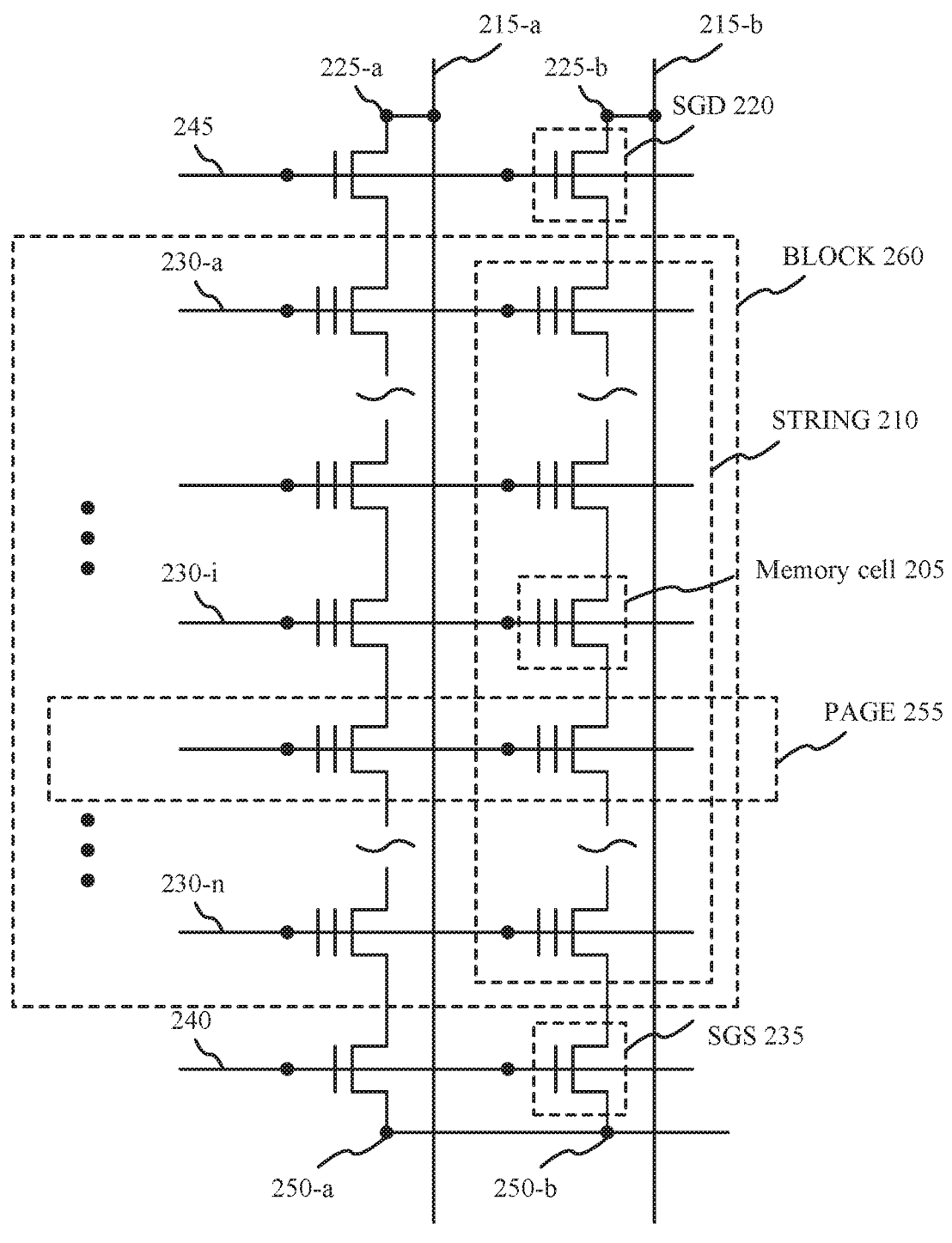
FIG. 2 illustrates an example of a NAND circuit that supports compressed logical-to-physical mapping for sequentially stored data in accordance with examples as disclosed herein.

FIG. 2 illustrates an example of NAND circuit 200 that supports compressed logical-to-physical mapping for sequentially stored data in accordance with examples of the present disclosure. NAND circuit 200 may be an example of a portion of a memory device, such as memory device 100. Although some elements included in FIG. 2 are labeled with reference numbers, other corresponding elements are not labeled, though they are the same or would be understood to be similar, in an effort to increase visibility and clarity of the depicted features.

NAND circuit 200 includes multiple Flash memory cells 205 (which may be, for example, Flash memory cells such as described with reference to FIG. 1) connected in a NAND configuration. In a NAND memory configuration (referred to as NAND memory), multiple Flash memory cells 205 are connected in series with each other to form strings 210 of memory cells 205, in which the drain of each Flash memory cell 205 in the string 210 is coupled with the source of another Flash memory cell 205 in the string. In some examples, Flash memory cells that are connected in a NAND configuration to form a NAND memory may be referred to as NAND memory cells.

Each string 210 of memory cells 205 may be associated with a corresponding digit line 215 (e.g., digit line 215-a, 215-b) that is shared by the memory cells 205 in the string 210. Each memory cell 205 in a string 210 may be associated with a separate word line 230 (e.g., word line 230-a, 230-i, 230-n), such that the quantity of word lines 230 may be equal to the quantity of memory cells 205 in a string 210.

NAND memory may be hierarchically organized as strings 210 that include multiple memory cells 205, pages 255 that include one or more memory cells 205 that are connected to the same word line 230 (e.g., memory cells 205 from multiple strings 210), blocks 260 that include one or more pages 255, planes that include one or more blocks 260, and dice that include one or more planes. A die may include one plane, or may include two planes that can operate in parallel, in some examples. A page of memory may be, for example, 4 kB of memory, 8 kB of memory, or another size.

A NAND memory cell may be erased before it can be re-written. In some examples, NAND memory can be written to and read from at the page level of granularity (e.g., by activating the corresponding word line 230), but may not be erasable at the page level of granularity. In some examples, NAND memory may instead be erasable at a higher level of granularity, such as at the block level of granularity. That is, a page 255 may be the smallest unit that may be written, and a block 260 may be the smallest unit that may be erased in some examples. Different memory devices may have different read/write/erase characteristics.

Each string 210 of memory cells 205 in NAND circuit 200 is coupled with a select gate device for drain (SGD) transistor 220 at one end of the string 210 and a select gate device for source (SGS) transistor 235 at the other end of the string 210. SGD transistor 220 and SGS transistor 235 may be used to couple a string 210 of memory cells 205 to a digit line 215 and/or to a source node 250 (e.g., source node 250-a, 250-b) by applying a voltage at the gate 245 of SGD transistor 220 and/or at the gate 240 of SGS transistor 235, respectively.

During NAND memory operations, various voltage levels associated with source node 250, gate 240 of an SGS transistor 235 associated with source node 250, word lines 230, drain node 225, gate 245 of an SGD transistor 220 associated with drain node 225, and digit line 215 may be applied to perform one or more operations (e.g., program, erase, or read) on at least some NAND memory cells in a string 210.

In some examples, during a read operation, a positive voltage may be applied to digit line 215 connected to drain node 225 whereas source node 250 may be connected to a ground or a virtual ground (e.g., approximately 0 V). For example, the voltage applied to drain node 225 may be 1 V. Concurrently, voltages applied to gates 245 and 240 may be increased above the threshold voltages of the one or more SGS transistors 235 associated with source node 250 and the one or more SGD transistors 220 associated with drain node 225, such that a channel associated with string 210 may be electrically connected to drain node 225 and source node 250. A channel may be an electrical path through the memory cells 205 in a string 210 (e.g., through the transistors in the memory cells 205) that may conduct current under certain operating conditions.

Concurrently, multiple word lines 230 (e.g., word lines 230-a, 230-i, 230-n, or in some examples all word lines 230) except a selected word line (i.e., word lines associated with unselected cells in string 210) may be connected to a voltage (e.g., VREAD) that is higher than the highest threshold voltage (VT) of memory cells in string 210. VREAD may cause some or all of the unselected memory cells in string 210 to turn "ON" so that each unselected memory cell can maintain high conductivity in a channel associated with it. In some examples, a word line 230 associated with a selected cell may be connected to a voltage, VTarget. VTarget may be selected at a value between VT of an erased memory cell and VT of a programmed memory cell in string 210. When the selected memory cell exhibits an erased VT (e.g., VTarget>VT of the selected memory cell), the selected memory cell 205 may turn "ON" in response to the application of VTarget and thus allow a current to flow in the channel of string 210 from digit line 215 to source 250. When the selected memory cell exhibits a programmed VT (e.g., hence VTarget<VT of the selected memory cell), the selected memory cell may turn "OFF" in response to VTarget and thus prohibit a current to flow in the channel of string 210 from digit line 215 to source 250. The amount of current flow (or lack thereof), may be sensed by sense component 170 as described with reference to FIG. 1 to read stored information in the selected memory cell 205 within string 210.

Figure 3:
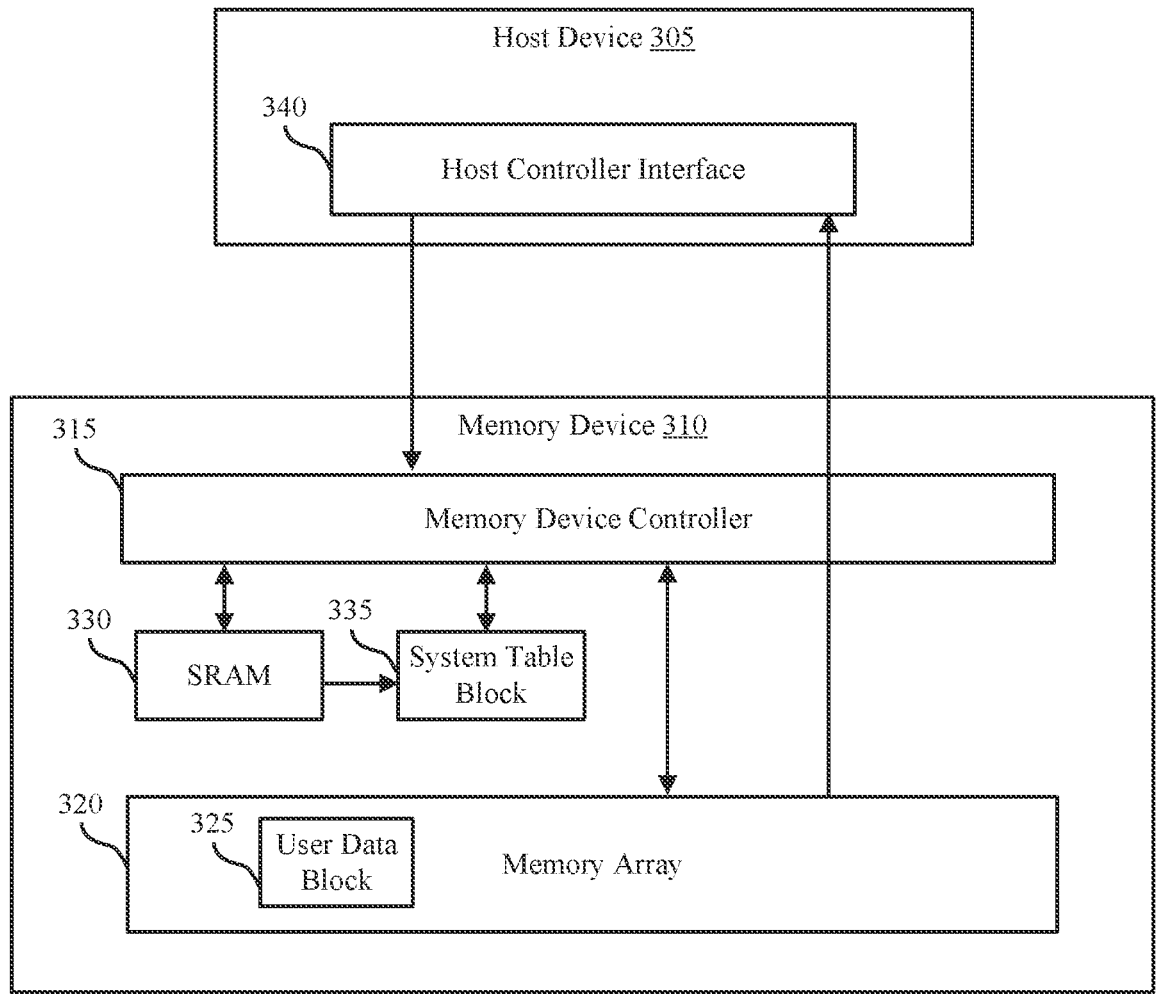
FIG. 3 illustrates an example of a system that supports compressed logical-to-physical mapping for sequentially stored data in accordance with examples as disclosed herein.

FIG. 3 is an example of a system 300 that supports compressed logical-to-physical mapping for sequentially stored data in accordance with examples of the present disclosure. The system 300 includes a host device 305 coupled with a memory device 310.

Memory device 310 may be an example of memory device 100 as described with reference to FIG. 1, such as managed memory device, a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

Memory device 310 may include a memory device controller 315, which may be an example of memory controller 155 described with reference to FIG. 1, and one or more memory arrays 320 for storing data. Memory arrays 320 may include one or more NAND memory arrays, for example, or other types of memory arrays for reading and writing data for host device 305; e.g., data that is provided by a host device 305 Memory arrays 320 may include a user data block 325 for storing user data.

Host device 305 may use memory device 310 to store data in one or more memory arrays 320 and read data from one or more memory arrays 320. Host device 305 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc.

In some examples, memory device 310 may include, in addition to memory arrays 320, SRAM 330 or other types of memory that may be used by memory device 310 for internal storage or calculations, for example. In some examples, SRAM 330 may be included within or coupled with memory device controller 315. In some examples, memory device 310 may store (e.g., write) a first-level L2P table (e.g., a set of entries) in SRAM 330.

In some examples, memory device 310 may include a system table block 335, which may be used, for example, for storing information related to the status of blocks of memory array 320. In some examples, system table block 335 may be included within memory arrays 320. System table block 335 may include non-volatile memory, such as NAND memory, DRAM, ferroelectric memory, other types of memory, or any combination thereof. In some examples, memory device 310 may store one or more second-level L2P tables and/or third-level L2P tables (or other levels of L2P tables, which may be referred to as sets of entries) in system table block 335.

In some examples, SRAM 330 and system table block 335 may be coupled with each other and SRAM 330 and/or system table block 335 may be coupled with memory device controller 315.

In some examples, memory device 310 may maintain one or more sets of entries (e.g., L2P look-up tables) for mapping LBAs generated by host device 305 to physical addresses (e.g., page addresses) of memory array 320. Such sets of entries may be generated based on receiving one or more write commands from the host device 305 that each include an LBA for writing data. In some examples, the L2P tables may include a first-level L2P table with entries pointing to second-level L2P tables, which in turn may include entries that point to third-level (e.g., terminal) L2P tables or that point directly to data stored sequentially in memory array 330.

In some examples, entries of a terminal L2P table may be ordered sequentially by an LBA index. For example, a first entry in a terminal L2P table (e.g.) may include a first physical address that corresponds to LBA N (thereby mapping LBA N to the first physical address), a second (consecutive) entry in the set of entries that includes a second physical address corresponding to LBA N+1, a third entry that includes a third physical address corresponding to LBA N+2, and so on. In some examples, if an entire terminal L2P table consists of sequential physical addresses (e.g., corresponding to the sequentially indexed LBAs of the table), memory device controller 315 may store an entry in a higher-level L2P table that includes the first physical address (e.g., the first physical address corresponding to the first LBA of the table, LBA N), along with an indication that the entry points directly to data in the memory array 320 rather than pointing to a terminal L2P table in the system table block 335.

Host device 305 includes host controller interface 340. Host controller interface 340 may provide an interface for passing control, address, data, and other signals between host device 305 and memory device 310. Host device 305 may transmit memory access commands, such as read or write commands, to memory device 310 using host controller interface 340.

Memory device controller 315 may receive signals from host device 305 via host controller interface 340 and may cause memory device 310 to perform certain operations in response to receiving such signals. For example, memory device controller 315 may receive a read or write command from host device 305 and, in response, may cause memory device 310 to read data or write data to memory array 330 based on the received command.

In some examples, memory device controller 315 may, during a read operation, access an entry in a first-level L2P table in SRAM 330 based on an LBA received in a read command from host device 305. The entry in the first-level L2P table may point to a page of system table block 335 that includes a second-level L2P table associated with the LBA received in the read command. Memory device controller 315 may access an entry of the second-level L2P table based on the LBA. The entry of the second-level L2P table may include a pointer to a physical address of memory array 320 (e.g., for accessing data within sequentially stored data in user data block 325) or a pointer to a third-level (e.g., terminal) L2P table in system table block 335. The entry of the second-level L2P table may also include a value of a flag that indicates whether the entry points to the data in user data block 325 or to a third-level L2P table in system table block 335.

If the entry in the second-level L2P table indicates that the entry points to sequential data in user data block 325, memory device controller 315 may read at least some, if not all, of the sequential data (e.g., one or more pages of data) in user data block 325 based on the starting physical address, and may transmit the data to the host device 305.

If the entry in the second-level L2P table indicates that the entry points to a third-level (terminal) L2P table in system table block 335, memory device controller 315 may read an entry of the third-level L2P table in system table block 335 to identify a physical address of the data in user data block 325. Memory device controller 315 may read the data (e.g., a page of data) in user data block 325 based on the physical address, and may transmit the data to the host device 305.

Figure 4:
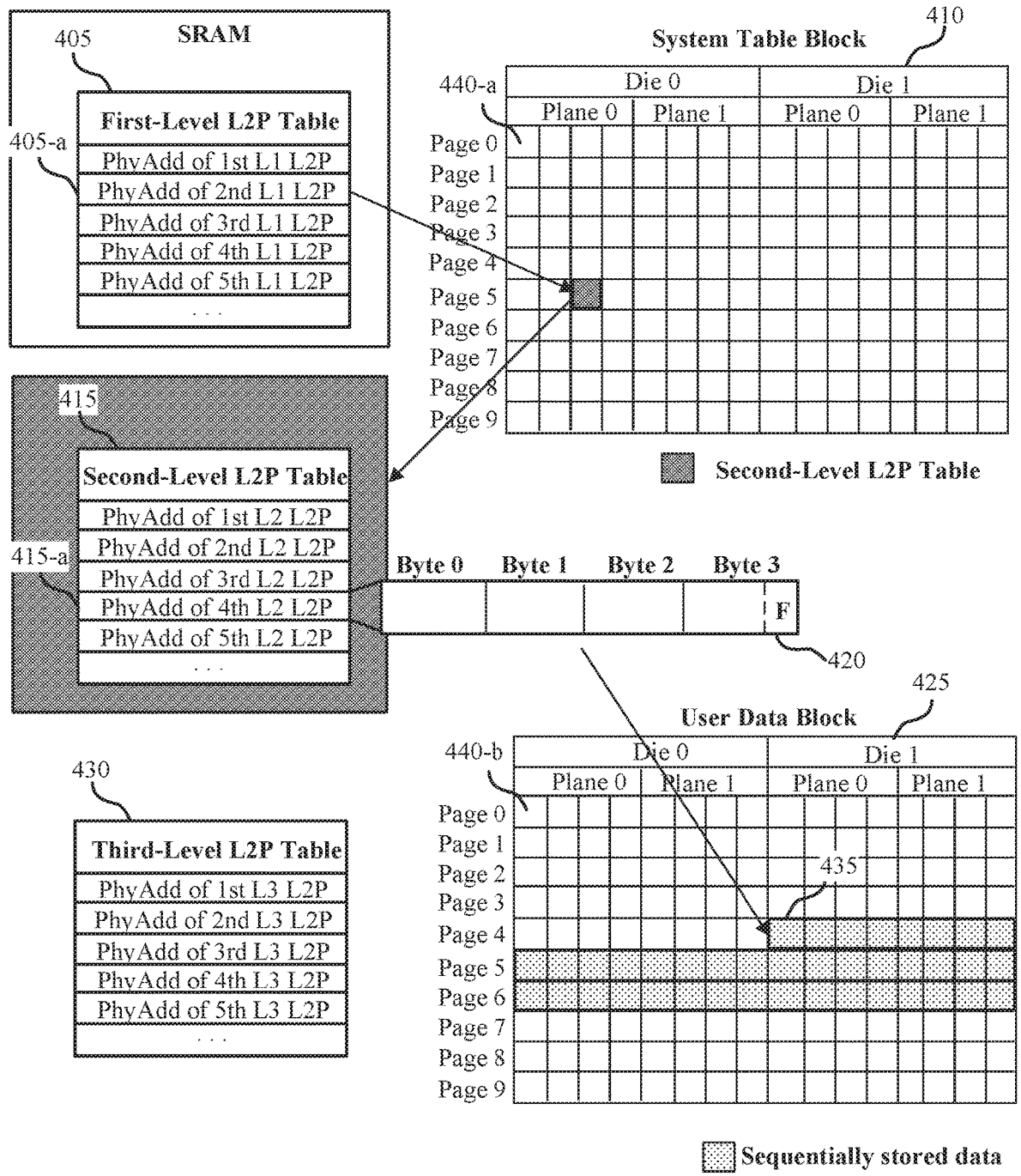
FIG. 4 illustrates an example of an operational flow that supports compressed logical-to-physical mapping for sequentially stored data in accordance with examples as disclosed herein.

FIG. 4 illustrates an operational flow 400 for reading data from a memory array using hierarchical L2P tables (e.g., L2P tables 405, 415, 430) that support compressed logical-to-physical mapping for sequentially stored data in accordance with examples as disclosed herein. In some examples, operational flow 400 may be performed by a memory device (such as memory device 310) in response to (e.g., based on) receiving a read command (e.g., from a host device 305) that includes or relates to an LBA, and may include or relate to mapping the LBA to a physical address in a user data block 425 of the memory device. Operational flow 400 may illustrate an example of flow for reading data that bypasses a terminal (e.g., third-level) L2P table.

Operational flow 400 depicts the use of a system table block 410, which may be an example of system table block 335 described with reference to FIG. 3. System table block 410 that may be included in or coupled with an SRAM of the memory device, such as SRAM 330. System table block 410 may be organized as multiple die (e.g., Die 0 and Die 1), each of which include one or more planes (e.g., Plane 0, Plane 1). Each plane may include multiple pages (e.g., page 0 through 9). In some examples, each square 440 (e.g., square 440-a) of system table block 410 may represent a page or a subset of a page. For example, if a page of system table block 410 is 16 kB, each square 440 (e.g., including square 440-a) may represent a 4 kB subset of the page.

Operational flow 400 further depicts the use of a user data block 425, which may be an example of user data block 325 described with reference to FIG. 3. User data block 425 that may be included in a memory array of the memory device, such as memory array 330. Like system table block 410, user data block 425 may be organized as multiple die (e.g., Die 0 and Die 1), each of which include one or more planes (e.g., Plane 0, Plane 1). Each plane may include multiple pages (e.g., page 0 through 9). Each square 440 (e.g., including square 440-b) of user data block 425 may represent a page or a subset of a page.

In some examples, a first-level L2P table 405 may be stored in system table block 410. In response to receiving a read command that includes an LBA, the memory device may read (e.g., retrieve, look up) an entry 405-a in the first-level L2P table 405 based on the LBA. In some examples, the entry 405-a may be associated with a group of LBAs that include the LBA received in the read command. The entry 405-a may include a physical address of a page of a system table block 410 that contains (e.g., stores) a second-level L2P table 415. In operational flow 400, for example, the entry 405-a may include a physical address that points to Page 5 (or a subset of Page 5) of Plane 0 of Die 0, which may contain second-level L2P table 415.

The memory device may then read an entry 415-a in second-level L2P table 415 based on the LBA. The entry 415-a may include a physical address of a page of a user data block 425 that corresponds to a first page of multiple pages of sequentially stored data. The multiple pages of sequentially stored data may include the page of data requested by the host device; e.g., the page of data indicated by the LBA in the read command.

In the example of operational flow 400, the entry 415-a may be a four-byte entry that includes a physical address that points to Page 4 (or a subset of Page 4) of Plane 0 of Die 1, where Page 4 may be the first page of multiple pages that include sequentially stored data. (The size of an entry of an L2P table may be different depending on various characteristics of a memory device.)

In some examples, the entry 415-a may include a flag 420 that may be set to a first value that indicates that the physical address in entry 415-a points directly to a page of data in user data block 425 or may be set to a second value that indicates that the physical address in entry 415-a points to a third-level L2P table in system table block 410. In operational flow 400, the value of the flag may be a first value, indicating that the physical address of entry 415-a points directly to a page of data in user data block 425. In some examples, a value of flag 420 may consume one or more bits in entry 415-a, such as a bit in the least significant byte (e.g., byte 3).

If the LBA included in the read command corresponds to the starting page 435 (e.g., first page, initial page) of the sequentially stored data (e.g., the page pointed to by the physical address in entry 415-a), the memory device may read the data from the starting page 435 and transmit the data to the host device.

If the LBA included in the read command corresponds to a different page (e.g., a page that is different than the starting page) of the sequentially stored data, the memory device may determine (e.g., calculate) a second physical address corresponding to the different page, such as by applying an offset to the physical address of entry 415-a to determine the second physical address. The memory device may read the data from the different page indicated by the second physical address, based on determining (e.g., calculating) the second physical address corresponding to the different page. The memory device may transmit the data to the host device.

Figure 5:
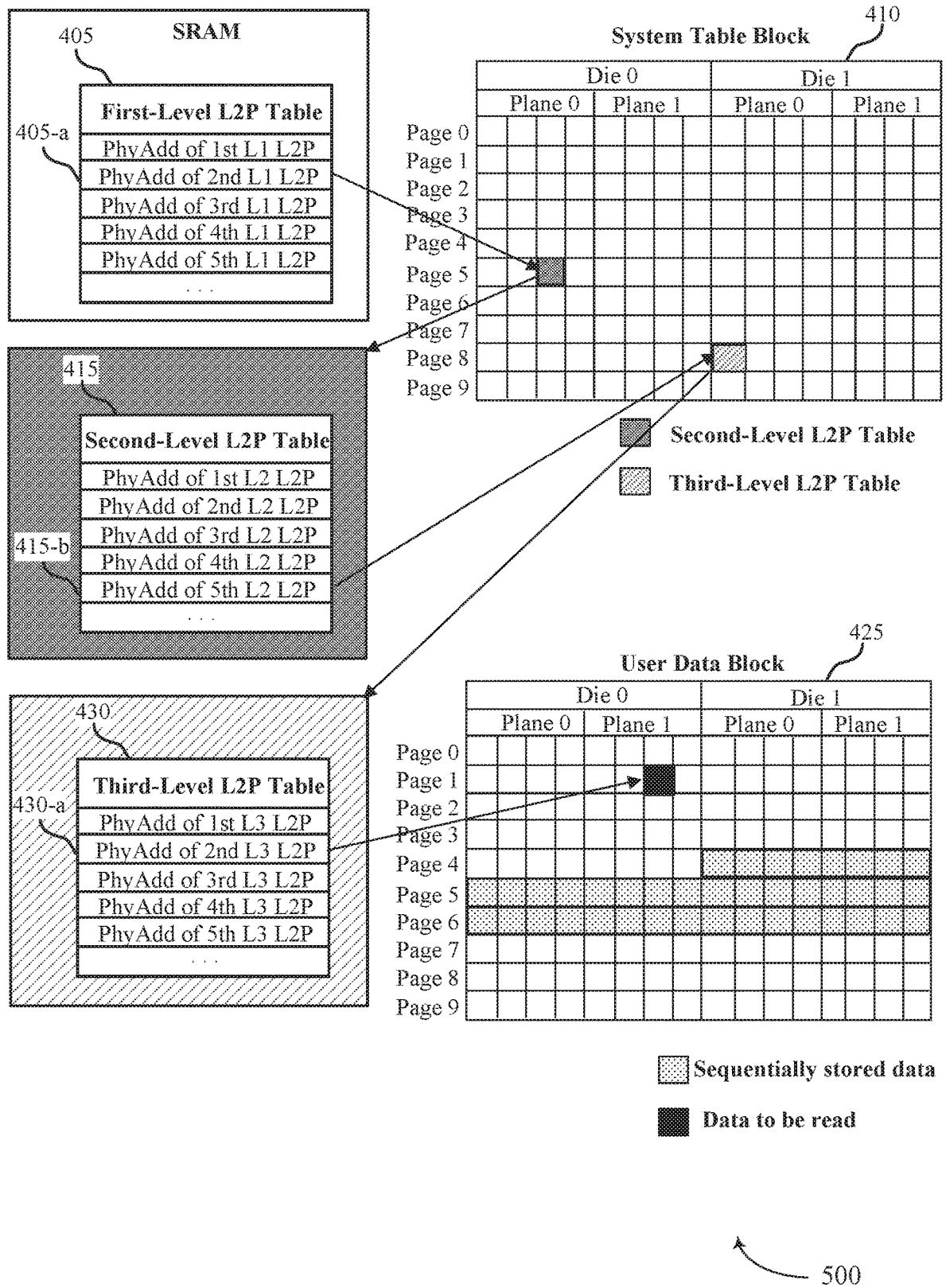
FIG. 5 illustrates an example of an operational flow that supports compressed logical-to-physical mapping for sequentially stored data in accordance with examples as disclosed herein.

FIG. 5 illustrates an operational flow 500 for reading data from a memory array using hierarchical L2P tables (e.g., L2P tables 405, 415, 430) that support compressed logical-to-physical mapping for sequentially stored data in accordance with examples as disclosed herein. In some examples, operational flow 500 may be performed by a memory device (such as memory device 310) based on receiving a read command (e.g., from a host device 305) that includes an LBA, and may include mapping the LBA to a physical address in a user data block 425 of the memory device. Operational flow 500 may be similar to operational flow 400 but may illustrate an example of a flow for reading data that does not bypass a terminal (e.g., third-level) L2P table.

In response to receiving a read command that includes a different LBA (e.g., a different LBA than the LBA described with reference to operational flow 400). In operational flow 500 the different LBA may be included within the group of LBAs associated with entry 405-a. Thus, the memory device may read the entry 405-a in the first-level L2P table 405 based on the different LBA. As discussed with reference to operational flow 400, entry 405-a may include a physical address of a page of system table block 410 that contains second-level L2P table 415. In various examples, the different LBA may be within a different group of LBAs, and may therefore be associated with a different entry of first-level L2P table 405 that points to a different second-level L2P table than second-level L2P table 415.

The memory device may read an entry 415-b in second-level L2P table 415 based on the LBA. The entry 415-b may be associated with a group of LBAs that includes the different LBA, and may include a physical address of a page of system table block 410 that contains a third-level L2P table 430 for mapping the group of LBAs to physical addresses. In operational flow 500, for example, the entry 415-b may include a physical address that points to Page 8 (or a subset of page 8) of Plane 0 of Die 1, which may contain third-level L2P table 430.

In the example of operational flow 500, the entry 415-b may, like entry 415-a of operational flow 400, be a four-byte entry that includes a flag 420 whose value indicates whether the physical address in entry 415-b points directly to a page of data in user data block 425 or points to a third-level L2P table in system table block 410. In operational flow 500, the value of the flag may indicate that the physical address of entry 415-b points to a third-level L2P table.

The memory device may read an entry 430-a in third-level L2P table 430 based on the LBA and based on the value flag indicating that the physical address points to a third-level L2P table in system table block 410; e.g., based on the LBA and in response to determining that the value of the flag indicates that the physical address points to a third-level L2P table. The entry 430-*a* may include a physical address of a page of user data block 425 that the data requested by the host device; e.g., the data associated with the LBA included in the read command. The memory device may read the data at the page of user data block 425 pointed to by the physical address of entry 430-*a* and transmit the data to the host device.

Thus, operational flow 500 may incur additional latency for reading data requested by the host device relative to operational flow 400, because in operational flow 500 the memory device may traverse (e.g., read entries from) all three levels of L2P tables, while in operational flow 400 the memory device may bypass the terminal L2P table.

Figure 6:
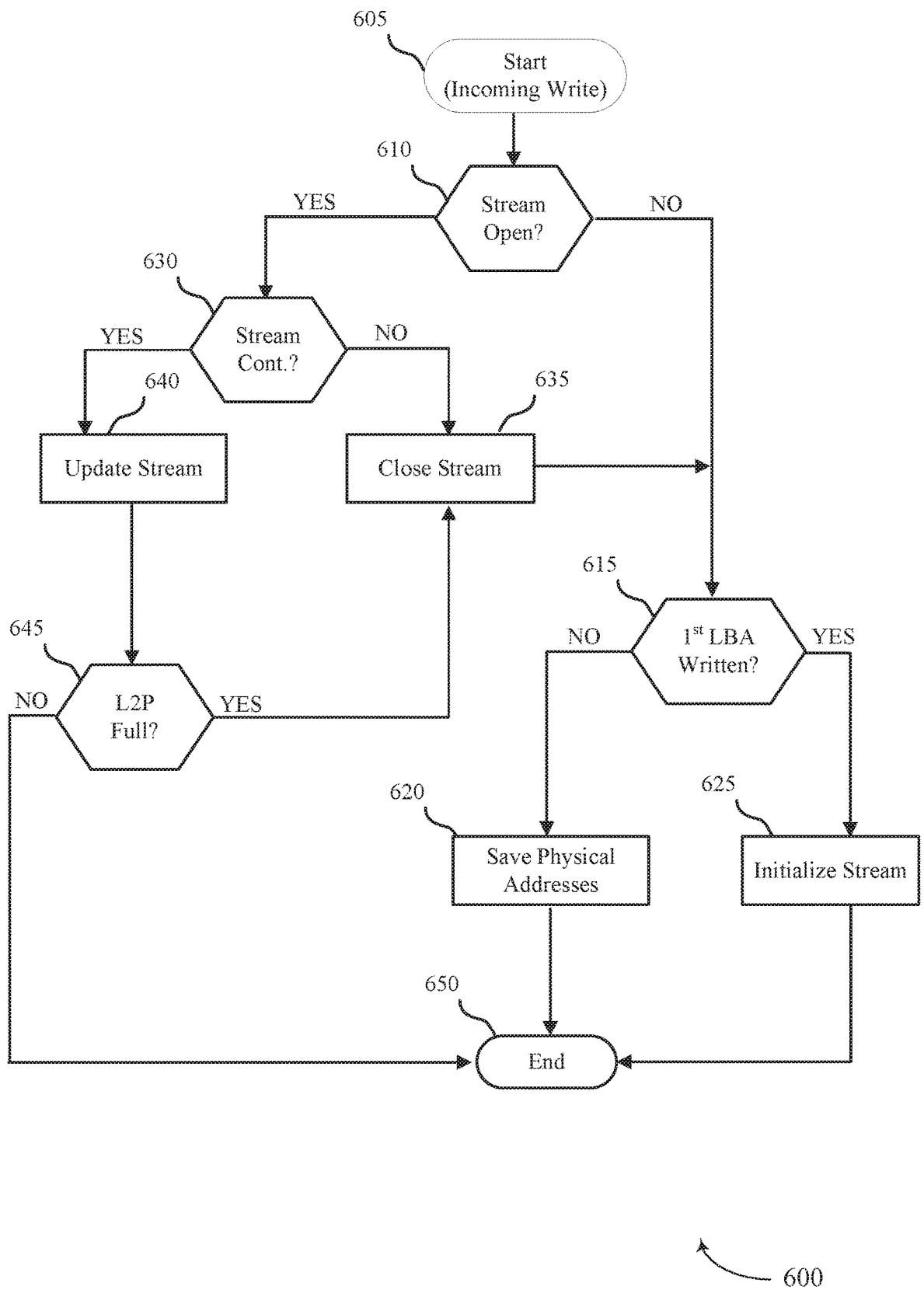
FIG. 6 illustrates an example of a process that supports compressed logical-to-physical mapping for sequentially stored data in accordance with examples as disclosed herein.

FIG. 6 illustrates an example of a flow 600 for building or updating a built L2P table that supports compressed logical-to-physical mapping for sequentially stored data in accordance with examples as disclosed herein. Flow 600 may be used to build or update an intermediate L2P table, such as a second-level L2P table, that may include entries that point directly to sequentially stored data and other entries that point to terminal L2P tables.

At 605, a memory device may initiate a process for building or updating one or more L2P tables in response to (e.g., based on), for example, receiving a write command from a host device. The write command may include an LBA associated with writing data to a user data block of the memory device.

In response to receiving the write command, at 610 the memory device may determine whether a sequential data stream is open. For example, the memory device may determine whether the LBA included in the write command received at 605 is sequential (having a sequential index, consecutive, contiguous) with an LBA included in a previous write command (e.g., a most recently received prior write command), or whether a physical address corresponding to the LBA included in the write command is consecutive with a physical address corresponding to an LBA of the previous write command, or whether other conditions or relationships exist, or any combination thereof.

In response to determining that a stream is not open, at 615 the memory device may determine whether the LBA included in the write command corresponds to the first LBA of a terminal L2P table (such as a third-level L2P table). That is, the memory device may determine whether a new stream may be initialized in case subsequent write commands cause the memory device to sequentially store data.

In response to determining that the LBA included in the write command does not correspond to the first LBA of a terminal L2P table, at 620 the memory device may store (e.g., write, save), in a L2P table, one or more physical addresses pointing to the data written in response to receiving the write command, and may end the current process at 650. In some examples, the L2P table may be a terminal table (e.g., if step 620 is performed after determining, at 610, that a stream is not open) or a higher-level table, such as a second-level table (e.g., if step 620 is performed after a stream is closed at 635 as described below).

In response to determining that the LBA included in the write command does correspond to the first LBA of a terminal L2P table, at 625 the memory device may initialize a stream. For example, the memory device may store an indication that a stream associated with the L2P table has been opened, or that data has been written at a physical address corresponding to a first entry of a terminal L2P table. In some examples, the memory device may save an indication of a number of entries in the L2P table that correspond to pages that have been sequentially stored. In some examples, the memory device may store the physical address in the first entry of the terminal L2P table.

Returning to the decision point of 610, in response to determining that a stream is open (e.g., that at least a first entry of a terminal L2P table has been written to the terminal L2P table or that data has been written to a user data block at a physical address corresponding to the first entry of the terminal table), at 630 the memory device may determine whether the stream is being continued (e.g., is related to one or more previous processes or operations, such as access operations). For example, the memory device may determine whether the LBA in the write command received at 605 is associated with storing data sequentially (e.g., at a consecutive physical address) relative to data written in response to receiving a prior write command in the stream.

In response to determining that the stream is not being continued, at 635 the memory device may close the stream. For example, the memory device may update the indication that the stream associated with the L2P table has been opened to indicate that the stream is now closed. The memory device may proceed to 615 and perform other steps of flow 600 as previously discussed.

In response to determining that the stream is being continued, at 640 the memory device may update the stream. For example, the memory device may update (e.g., increment) the indication of the quantity of entries in the L2P table that correspond to pages that have been sequentially stored.

At 645, the memory device may determine whether the terminal L2P table has been filled with sequentially stored physical addresses.

In response to determining that the terminal L2P table has not been filled with sequentially stored physical addresses, the memory device may end the current process at 650.

In response to determining that the terminal L2P table has been filled with sequentially stored physical addresses, the memory device may close the stream at 635 as previously described. In this case, the memory device may, at 620, save the physical address of the first LBA of the terminal table in a higher-level L2P table, such as a second-level L2P table.

In some examples, a memory device may, while a stream is open, continue storing entries (physical addresses) in the terminal L2P table each time the memory device stores data at a sequential physical address, and may subsequently discard (e.g., erase, overwrite) the terminal L2P table if the memory device determines that the terminal L2P table has become full of sequentially stored physical addresses.

Thus, flow 600 describes a process for building or maintaining L2P tables that may enable a memory device to bypass accessing (or maintaining) a terminal L2P table when data is sequentially stored.

In some examples, a memory device may receive two or more interleaved streams of write commands, in which each stream includes may include write commands having consecutive logical block addresses that may cause the memory device to write the data for each stream to a corresponding set of consecutive physical addresses. In this example, the memory device may identify different blocks of memory at which to write the data for each stream to enable the multiple streams to be associated with corresponding entries in a second-level L2P table. For example, the memory device may write the first stream of data (e.g., associated with a first stream of write commands) at consecutive physical addresses of a first block of memory, and may write a second stream of data (e.g., associated with a second stream of write commands) at consecutive physical addresses of a second block of memory (e.g., different than the first block of memory). The memory device may store a first entry in an L2P table that includes the starting physical address of the first stream, and may store a second entry in an L2P table that includes the starting physical address of the second stream.

Figure 7:
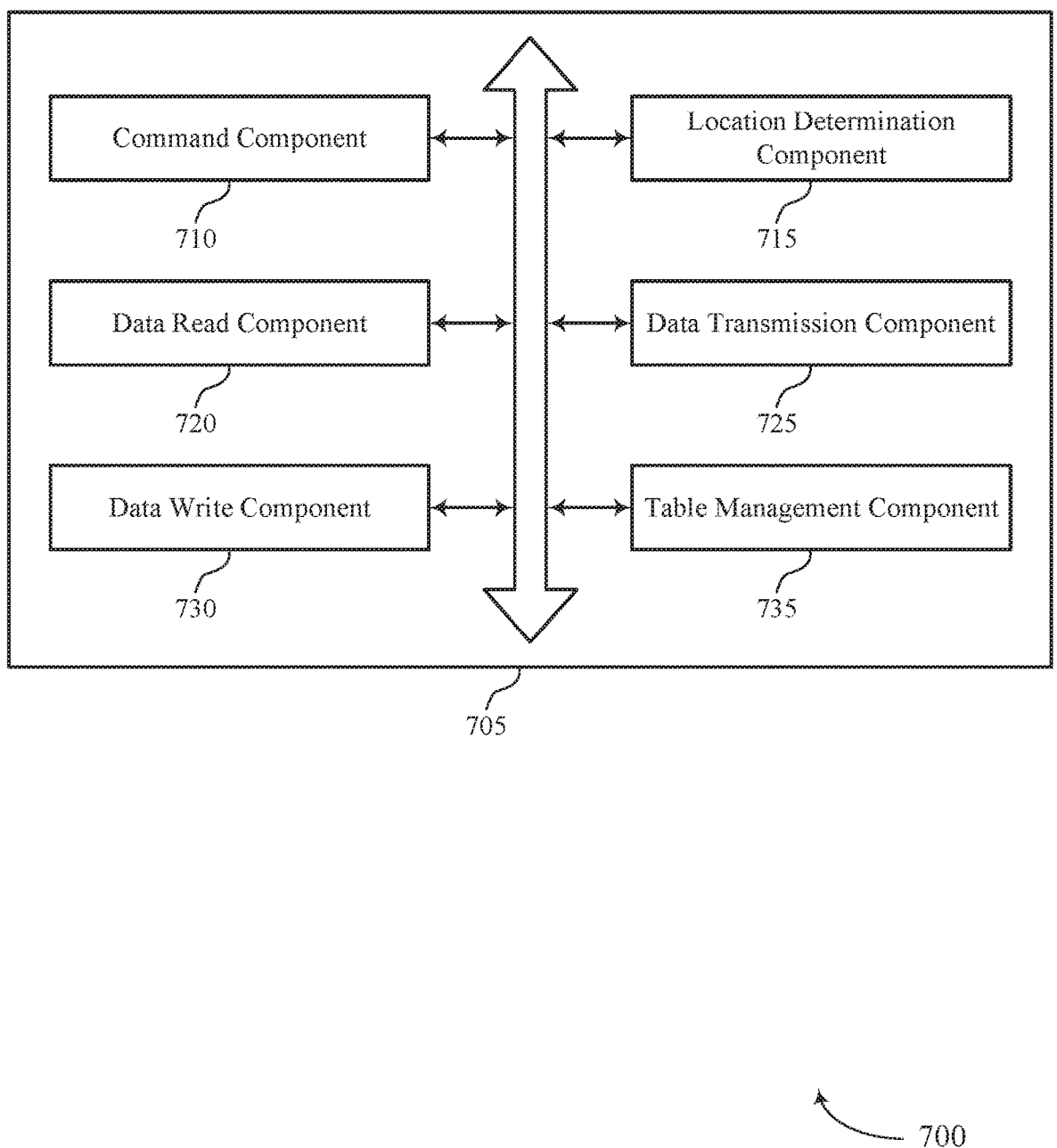
FIG. 7 shows a block diagram of a memory device that supports compressed logical-to-physical mapping for sequentially stored data in accordance with examples as disclosed herein.

FIG. 7 shows a block diagram 700 of a memory device that supports compressed logical-to-physical mapping for sequentially stored data in accordance with examples as disclosed herein. The memory device 705 may be an example of aspects of a memory device as described with reference to FIGS. 1 through 5. The memory device 705 may include a command component 710, a location determination component 715, a data read component 720, a data transmission component 725, a data write component 730, and a table management component 735. Each of these modules may communicate, directly or indirectly, with one another (e.g., via one or more buses).

The command component 710 may receive, at a memory device from a host device, a read command including a first logical block address associated with a location of at least a portion of data stored in the memory device, where the data spans a set of consecutive physical addresses.

In some examples, the command component 710 may receive, at a memory device from a host device, a set of write commands for writing data to the memory device, the set of write commands including: a first write command including a first logical block address corresponding to a first entry of a quantity of entries for mapping a set of consecutive logical block addresses to a corresponding set of physical addresses, and a set of remaining write commands of the set of write commands each including a respective consecutive logical block address.

In some examples, the command component 710 may receive, at the memory device from the host device, a second read command including a second logical block address associated with second data stored in the memory device.

In some examples, the command component 710 may receive, from the host device before receiving the read command, a set of write commands, a first write command of the set of write commands including the first logical block address corresponding to the first physical address, where the set of write commands is associated with writing the data to the set of consecutive physical addresses.

In some examples, the command component 710 may receive, at the memory device from the host device after storing the first physical address and the first value of the flag in the first entry, a read command including a third logical block address of the consecutive logical block addresses.

In some examples, the command component 710 may receive, at the memory device from the host device, a second set of write commands for writing second data to the memory device, the second set of write commands interleaved with the set of write commands and including: a second write command including a third logical block address corresponding to a first entry of a second quantity of entries for mapping a second set of consecutive logical block addresses to a corresponding second set of physical addresses, and a second set of remaining write commands of the second set of write commands each including a second respective consecutive logical block address.

In some examples, the first logical block address corresponds to the first physical address and each of the respective consecutive logical block addresses corresponding to respective consecutive physical addresses of the set of consecutive physical addresses.

The location determination component 715 may determine, based on the first logical block address, a memory location of a first set of entries for mapping a first set of logical block addresses including the first logical block address to a corresponding first set of physical addresses.

In some examples, the location determination component 715 may determine, based on the first physical address and the first value of the flag, the second physical address based on identifying an offset from the first physical address.

In some examples, the location determination component 715 may determine a third physical address indicating the location of the first set of entries based on the first logical block address.

In some examples, the location determine component 715 may determine, based on the second logical block address, the memory location of the first set of entries for mapping the first set of logical block addresses to the corresponding first set of physical addresses, where the first set of logical block addresses includes the second logical block address.

In some examples, the location determination component 715 may identify a second block different than the first block based on receiving the second set of write commands.

In some examples, the third physical address indicates a location of a first page of a first type of memory of the memory device, and the set of consecutive physical addresses indicates locations of a set of pages of a second type of memory in the memory device.

In some examples, the first type of memory includes SRAM of the memory device and the second type of memory includes NAND memory of the memory device.

The data read component 720 may read at least the portion of the data from a second physical address of the set of consecutive physical addresses based on the first physical address and the first value of the flag.

In some examples, the data read component 720 may read the second data from the fourth physical address based on identifying the first entry of the second set of entries.

In some examples, the data read component 720 may read a second portion of the data from the second physical address based on identifying the second physical address.

The data transmission component 725 may transmit the data to the host device.

In some examples, the data transmission component 725 may transmit the second data to the host device.

In some examples, the data transmission component 725 may transmit the second portion of the data to the host device.

The data write component 730 may store the data in the memory device at a set of consecutive physical addresses starting with a first physical address based on receiving the set of write commands.

In some examples, the data write component 730 may store the data at the set of consecutive physical addresses based on receiving the set of write commands.

In some examples, the data write component 730 may store the second data in the memory device at a second set of consecutive physical addresses of the second block starting with a fourth physical address.

The table management component 735 may read, based on the first logical block address, a first entry of the first set of entries, the first entry including a first physical address of the set of consecutive physical addresses and a first value of a flag.

In some examples, the table management component 735 may determine whether a quantity of logical block addresses including the first logical block address and the respective logical block addresses matches the quantity of entries.

In some examples, the table management component 735 may store, based on determining that the quantity of logical block addresses matches the quantity of entries, the first physical address and a first value of a flag in a first entry of a set of entries for mapping a set of logical block addresses including the quantity of logical block addresses to a corresponding set of physical block addresses including the set of consecutive physical addresses.

In some examples, the table management component 735 may read, based on determining the memory location of the first set of entries and on the second logical block address, a second entry of the first set of entries, the second entry including a second physical address and a second value of the flag, where the second physical address indicates a location of a second set of entries for mapping a subset of the first set of logical block addresses, including the second logical block address, to a corresponding subset of the first set of physical addresses.

In some examples, the table management component 735 may identify, based on the second entry of the first set of entries, a first entry of the second set of entries, the first entry of the second set of entries including a fourth physical address indicating a location of the second data.

In some examples, the table management component 735 may store, before receiving the read command, the first value of the flag and the first physical address of the set of consecutive physical addresses in the first entry of the first set of entries based on writing the data to the set of consecutive physical addresses.

In some examples, the table management component 735 may store, for each write command of the set of write commands, a respective entry in a second set of entries including the quantity of entries, the second set of entries for mapping the quantity of logical block addresses to the set of consecutive physical addresses.

In some examples, the table management component 735 may discard, based on determining that the quantity of logical block addresses matches the quantity of entries, the second set of entries.

In some examples, the table management component 735 may read the first entry of the set of entries to read the first physical address and the first value of the flag based on receiving the read command including the third logical block address.

In some examples, the table management component 735 may identify a second physical address of the set of consecutive physical addresses based on reading the first entry.

In some examples, the table management component 735 may determine whether a second quantity of logical block addresses including the third logical block address and the second respective logical block addresses matches the second quantity of entries.

In some examples, the table management component 735 may store, based on determining that the second quantity of logical block addresses matches the second quantity of entries, the fourth physical address and the first value of the flag in a first entry of a second set of entries for mapping a second set of logical block addresses including the second quantity of logical block addresses to a corresponding second set of physical block addresses including the second set of consecutive physical addresses.

In some examples, the first physical address corresponds to a starting page of a set of pages corresponding to the set of consecutive physical addresses.

In some examples, the first physical address and the second physical address are the same physical address.

In some examples, the first value of the flag indicates that the first physical address includes a location of the at least the portion of the data.

Figure 8:
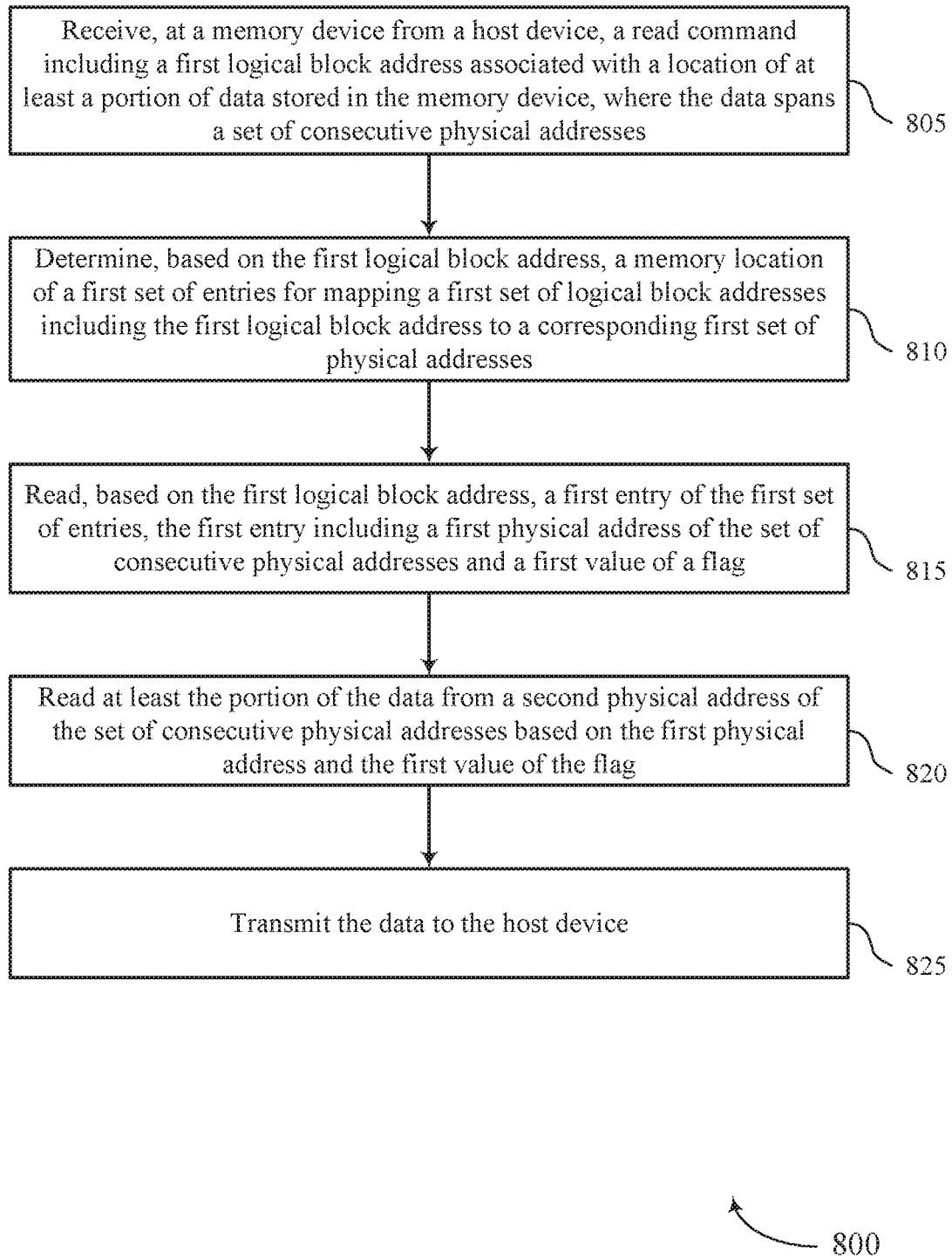
FIGS. 8 and 9 show flowcharts illustrating a method or methods that support compressed logical-to-physical mapping for sequentially stored data in accordance with examples as disclosed herein.

FIG. 8 shows a flowchart illustrating a method or methods 800 that supports compressed logical-to-physical mapping for sequentially stored data in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the memory device may receive, at a memory device from a host device, a read command including a first logical block address associated with a location of at least a portion of data stored in the memory device, where the data spans a set of consecutive physical addresses. The operations of 805 may be performed according to the methods described herein. In some examples, aspects of the operations of 805 may be performed by a command component as described with reference to FIG. 7.

At 810, the memory device may determine, based on the first logical block address, a memory location of a first set of entries for mapping a first set of logical block addresses including the first logical block address to a corresponding first set of physical addresses. The operations of 810 may be performed according to the methods described herein. In some examples, aspects of the operations of 810 may be performed by a location determination component as described with reference to FIG. 7.

At 815, the memory device may read, based on the first logical block address, a first entry of the first set of entries, the first entry including a first physical address of the set of consecutive physical addresses and a first value of a flag. The operations of 815 may be performed according to the methods described herein. In some examples, aspects of the operations of 815 may be performed by a table management component as described with reference to FIG. 7.

At 820, the memory device may read at least the portion of the data from a second physical address of the set of consecutive physical addresses based on the first physical address and the first value of the flag. The operations of 820 may be performed according to the methods described herein. In some examples, aspects of the operations of 820 may be performed by a data read component as described with reference to FIG. 7.

At 825, the memory device may transmit the data to the host device. The operations of 825 may be performed according to the methods described herein. In some examples, aspects of the operations of 825 may be performed by a data transmission component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for receiving, at a memory device from a host device, a read command including a first logical block address associated with a location of at least a portion of data stored in the memory device, where the data spans a set of consecutive physical addresses, determining, based on the first logical block address, a memory location of a first set of entries for mapping a first set of logical block addresses including the first logical block address to a corresponding first set of physical addresses, reading, based on the first logical block address, a first entry of the first set of entries, the first entry including a first physical address of the set of consecutive physical addresses and a first value of a flag, reading at least the portion of the data from a second physical address of the set of consecutive physical addresses based on the first physical address and the first value of the flag, and transmitting the data to the host device.

Some examples of the method 800 and the apparatus described herein may further include operations, features, means, or instructions for determining, based on the first physical address and the first value of the flag, the second physical address based on identifying an offset from the first physical address.

In some examples of the method 800 and the apparatus described herein, the first physical address corresponds to a starting page of a set of pages corresponding to the set of consecutive physical addresses.

In some examples of the method 800 and the apparatus described herein, the first physical address and the second physical address may be the same physical address.

In some examples of the method 800 and the apparatus described herein, determining the memory location of the first set of entries may include operations, features, means, or instructions for determining a third physical address indicating the location of the first set of entries based on the first logical block address.

In some examples of the method 800 and the apparatus described herein, the third physical address indicates a location of a first page of a first type of memory of the memory device, and the set of consecutive physical addresses indicates locations of a set of pages of a second type of memory in the memory device.

In some examples of the method 800 and the apparatus described herein, the first type of memory includes SRAM of the memory device and the second type of memory includes NAND memory of the memory device.

Some examples of the method 800 and the apparatus described herein may further include operations, features, means, or instructions for receiving, at the memory device from the host device, a second read command including a second logical block address associated with second data stored in the memory device, determining, based on the second logical block address, the memory location of the first set of entries for mapping the first set of logical block addresses to the corresponding first set of physical addresses, where the first set of logical block addresses includes the second logical block address, reading, based on determining the memory location of the first set of entries and on the second logical block address, a second entry of the first set of entries, the second entry including a second physical address and a second value of the flag, where the second physical address indicates a location of a second set of entries for mapping a subset of the first set of logical block addresses, including the second logical block address, to a corresponding subset of the first set of physical addresses, identifying, based on the second entry of the first set of entries, a first entry of the second set of entries, the first entry of the second set of entries including a fourth physical address indicating a location of the second data, reading the second data from the fourth physical address based on identifying the first entry of the second set of entries, and transmitting the second data to the host device.

Some examples of the method 800 and the apparatus described herein may further include operations, features, means, or instructions for receiving, from the host device before receiving the read command, a set of write commands, a first write command of the set of write commands including the first logical block address corresponding to the first physical address, where the set of write commands may be associated with writing the data to the set of consecutive physical addresses, and storing the data at the set of consecutive physical addresses based on receiving the set of write commands.

Some examples of the method 800 and the apparatus described herein may further include operations, features, means, or instructions for storing, before receiving the read command, the first value of the flag and the first physical address of the set of consecutive physical addresses in the first entry of the first set of entries based on writing the data to the set of consecutive physical addresses.

In some examples of the method 800 and the apparatus described herein, the first value of the flag indicates that the first physical address includes a location of the at least the portion of the data.

Figure 9:
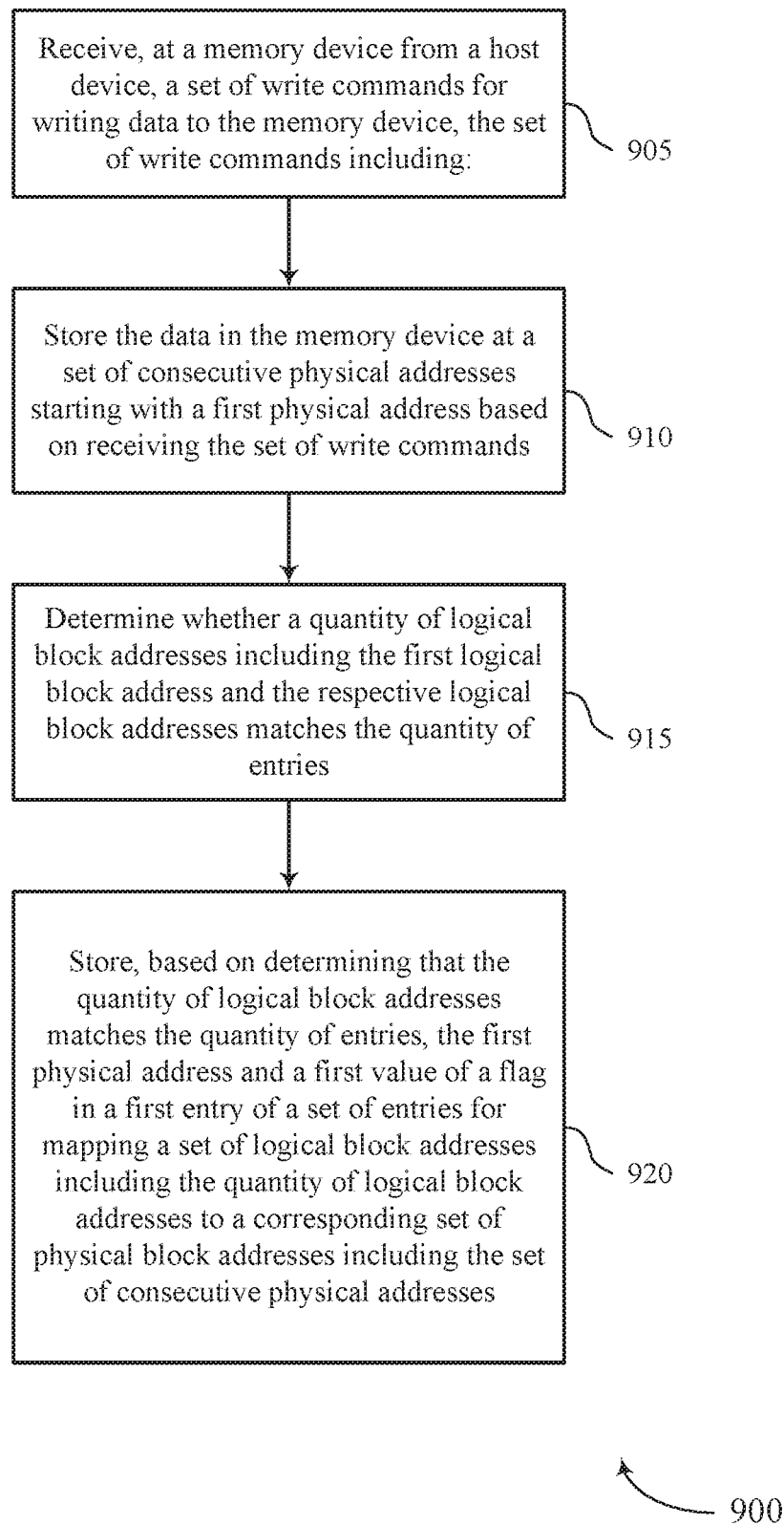

FIG. 9 shows a flowchart illustrating a method or methods 900 that supports compressed logical-to-physical mapping for sequentially stored data in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 905, the memory device may receive, at a memory device from a host device, a set of write commands for writing data to the memory device, the set of write commands including. The operations of 905 may be performed according to the methods described herein. In some examples, aspects of the operations of 905 may be performed by a command component as described with reference to FIG. 7.

At 910, the memory device may store the data in the memory device at a set of consecutive physical addresses starting with a first physical address based on receiving the set of write commands. The operations of 910 may be performed according to the methods described herein. In some examples, aspects of the operations of 910 may be performed by a data write component as described with reference to FIG. 7.

At 915, the memory device may determine whether a quantity of logical block addresses including the first logical block address and the respective logical block addresses matches the quantity of entries. The operations of 915 may be performed according to the methods described herein. In some examples, aspects of the operations of 915 may be performed by a table management component as described with reference to FIG. 7.

At 920, the memory device may store, based on determining that the quantity of logical block addresses matches the quantity of entries, the first physical address and a first value of a flag in a first entry of a set of entries for mapping a set of logical block addresses including the quantity of logical block addresses to a corresponding set of physical block addresses including the set of consecutive physical addresses. The operations of 920 may be performed according to the methods described herein. In some examples, aspects of the operations of 920 may be performed by a table management component as described with reference to FIG. 7.

In some examples, an apparatus as described herein may perform a method or methods, such as the method 900. The apparatus may include features, means, or instructions (e.g., a non-transitory computer-readable medium storing instructions executable by a processor) for receiving, at a memory device from a host device, a set of write commands for writing data to the memory device, the set of write commands including, storing the data in the memory device at a set of consecutive physical addresses starting with a first physical address based on receiving the set of write commands, determining whether a quantity of logical block addresses including the first logical block address and the respective logical block addresses matches the quantity of entries, and storing, based on determining that the quantity of logical block addresses matches the quantity of entries, the first physical address and a first value of a flag in a first entry of a set of entries for mapping a set of logical block addresses including the quantity of logical block addresses to a corresponding set of physical block addresses including the set of consecutive physical addresses.

In some examples of the method 900 and the apparatus described herein, the first logical block address corresponds to the first physical address and each of the respective consecutive logical block addresses corresponding to respective consecutive physical addresses of the set of consecutive physical addresses.

Some examples of the method 900 and the apparatus described herein may further include operations, features, means, or instructions for storing, for each write command of the set of write commands, a respective entry in a second set of entries including the quantity of entries, the second set of entries for mapping the quantity of logical block addresses to the set of consecutive physical addresses, and discarding, based on determining that the quantity of logical block addresses matches the quantity of entries, the second set of entries.

Some examples of the method 900 and the apparatus described herein may further include operations, features, means, or instructions for receiving, at the memory device from the host device after storing the first physical address and the first value of the flag in the first entry, a read command including a third logical block address of the consecutive logical block addresses, reading the first entry of the set of entries to read the first physical address and the first value of the flag based on receiving the read command including the third logical block address, identifying a second physical address of the set of consecutive physical addresses based on reading the first entry, reading a second portion of the data from the second physical address based on identifying the second physical address, and transmitting the second portion of the data to the host device.

Some examples of the method 900 and the apparatus described herein may further include operations, features, means, or instructions for receiving, at the memory device from the host device, a second set of write commands for writing second data to the memory device, the second set of write commands interleaved with the set of write commands and including, identifying a second block different than the first block based on receiving the second set of write commands, storing the second data in the memory device at a second set of consecutive physical addresses of the second block starting with a fourth physical address, determining whether a second quantity of logical block addresses including the third logical block address and the second respective logical block addresses matches the second quantity of entries, and storing, based on determining that the second quantity of logical block addresses matches the second quantity of entries, the fourth physical address and the first value of the flag in a first entry of a second set of entries for mapping a second set of logical block addresses including the second quantity of logical block addresses to a corresponding second set of physical block addresses including the second set of consecutive physical addresses.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory array; and
   a control component coupled with the memory array and configured to cause the apparatus to:
   receive, from a host device, a read command comprising a first logical block address associated with a location of at least a portion of data stored in the apparatus, wherein the data spans a plurality of consecutive physical addresses;
   determine, based at least in part on the first logical block address, a memory location of a first plurality of entries that map a first plurality of logical block addresses comprising the first logical block address to a corresponding first plurality of physical addresses;
   read, based at least in part on the first logical block address, a first entry of the first plurality of entries, the first entry comprising a first physical address of the plurality of consecutive physical addresses and a first value of a flag, wherein the first value of the flag indicates that the first physical address points to one of the plurality of consecutive physical addresses over which the at least the portion of the data spans, and wherein a second value of the flag indicates that the first physical address points to a memory location of a second plurality of entries that map a subset of the first plurality of logical block addresses to a corresponding subset of the first plurality of physical addresses;
   read the at least the portion of the data from a second physical address of the plurality of consecutive physical addresses based at least in part on the first physical address and the first value of the flag; and transmit the data to the host device.

2. The apparatus of claim 1, wherein the control component is further configured to cause the apparatus to:
determine, based at least in part on the first physical address and the first value of the flag, the second physical address based at least in part on identifying a non-zero offset from the first physical address.

3. The apparatus of claim 1, wherein the first physical address corresponds to a starting page of a plurality of pages corresponding to the plurality of consecutive physical addresses.

4. The apparatus of claim 1, wherein the control component is configured to cause the apparatus to determine the memory location of the first plurality of entries by determining a third physical address indicating the memory location of the first plurality of entries based at least in part on the first logical block address.

5. The apparatus of claim 4, wherein the third physical address indicates a location of a first page of a first type of memory of the apparatus, and the plurality of consecutive physical addresses indicates locations of a plurality of pages of a second type of memory in the apparatus.

6. The apparatus of claim 5, wherein the first type of memory comprises SRAM of the apparatus and the second type of memory comprises NAND memory of the apparatus.

7. The apparatus of claim 1, wherein the control component is further configured to cause the apparatus to:
receive, from the host device before receiving the read command, a plurality of write commands, a first write command of the plurality of write commands comprising the first logical block address corresponding to the first physical address, wherein the plurality of write commands is associated with writing the data to the plurality of consecutive physical addresses; and
store the data at the plurality of consecutive physical addresses based at least in part on receiving the plurality of write commands.

8. The apparatus of claim 7, wherein the control component is further configured to cause the apparatus to:
store, before receiving the read command, the first value of the flag and the first physical address of the plurality of consecutive physical addresses in the first entry of the first plurality of entries based at least in part on writing the data to the plurality of consecutive physical addresses.

9. The apparatus of claim 1, wherein the first value of the flag indicates that the first physical address comprises the location of the at least the portion of the data.

10. A non-transitory computer-readable medium storing code comprising instructions, which when executed by a processor of an electronic device, cause the electronic device to:
receive, from a host device, a read command comprising a first logical block address associated with a location of at least a portion of data stored in the electronic device, wherein the data spans a plurality of consecutive physical addresses;
determine, based at least in part on the first logical block address, a memory location of a first plurality of entries that map a first plurality of logical block addresses comprising the first logical block address to a corresponding first plurality of physical addresses;
read, based at least in part on the first logical block address, a first entry of the first plurality of entries, the first entry comprising a first physical address of the plurality of consecutive physical addresses and a first value of a flag, wherein the first value of the flag indicates that the first physical address points to one of the plurality of consecutive physical addresses over which the at least the portion of the data spans, and wherein a second value of the flag indicates that the first physical address points to a memory location of a second plurality of entries that map a subset of the first plurality of logical block addresses to a corresponding subset of the first plurality of physical addresses;
read the at least the portion of the data from a second physical address of the plurality of consecutive physical addresses based at least in part on the first physical address and the first value of the flag; and
transmit the data to the host device.

11. The non-transitory computer-readable medium of claim 10, wherein the instructions, when executed by the processor of the electronic device, further cause the electronic device to:
determine, based at least in part on the first physical address and the first value of the flag, the second physical address based at least in part on identifying a non-zero offset from the first physical address.

12. The non-transitory computer-readable medium of claim 10, wherein the first physical address corresponds to a starting page of a plurality of pages corresponding to the plurality of consecutive physical addresses.

13. The non-transitory computer-readable medium of claim 10, wherein the instructions, when executed by the processor of the electronic device, cause the electronic device to determine the memory location of the first plurality of entries by determining a third physical address indicating the memory location of the first plurality of entries based at least in part on the first logical block address.

14. The non-transitory computer-readable medium of claim 13, wherein the third physical address indicates a location of a first page of a first type of memory of the electronic device, and the plurality of consecutive physical addresses indicates locations of a plurality of pages of a second type of memory in the electronic device.

15. The non-transitory computer-readable medium of claim 14, wherein the first type of memory comprises SRAM of the electronic device and the second type of memory comprises NAND memory of the electronic device.

16. The non-transitory computer-readable medium of claim 10, wherein the instructions, when executed by the processor of the electronic device, further cause the electronic device to:
receive, from the host device before receiving the read command, a plurality of write commands, a first write command of the plurality of write commands comprising the first logical block address corresponding to the first physical address, wherein the plurality of write commands is associated with writing the data to the plurality of consecutive physical addresses; and
store the data at the plurality of consecutive physical addresses based at least in part on receiving the plurality of write commands.

17. A method, comprising:
receiving, from a host device, a read command comprising a first logical block address associated with a location of at least a portion of data stored in a memory device, wherein the data spans a plurality of consecutive physical addresses;
determining, based at least in part on the first logical block address, a memory location of a first plurality of entries that map a first plurality of logical block addresses comprising the first logical block address to a corresponding first plurality of physical addresses;

reading, based at least in part on the first logical block address, a first entry of the first plurality of entries, the first entry comprising a first physical address of the plurality of consecutive physical addresses and a first value of a flag, wherein the first value of the flag indicates that the first physical address points to one of the plurality of consecutive physical addresses over which the at least the portion of the data spans, and wherein a second value of the flag indicates that the first physical address points to a memory location of a second plurality of entries that map a subset of the first plurality of logical block addresses to a corresponding subset of the first plurality of physical addresses;

reading the at least the portion of the data from a second physical address of the plurality of consecutive physical addresses based at least in part on the first physical address and the first value of the flag; and transmitting the data to the host device.

18. The method of claim 17, further comprising:
determining, based at least in part on the first physical address and the first value of the flag, the second physical address based at least in part on identifying a non-zero offset from the first physical address.

19. The method of claim 17, wherein the first physical address corresponds to a starting page of a plurality of pages corresponding to the plurality of consecutive physical addresses.

20. The method of claim 17, wherein determining the memory location of the first plurality of entries comprises:
determining a third physical address indicating the memory location of the first plurality of entries based at least in part on the first logical block address.

21. An apparatus, comprising:
a memory array; and
a control component coupled with the memory array and configured to cause the apparatus to:
receive, from a host device, a read command comprising a first logical block address associated with a location of at least a portion of data stored in the apparatus, wherein the data spans a plurality of consecutive physical addresses;
determine, based at least in part on the first logical block address, a memory location of a first plurality of entries that map a first plurality of logical block addresses comprising the first logical block address to a corresponding first plurality of physical addresses;
read, based at least in part on the first logical block address, a first entry of the first plurality of entries, the first entry comprising a first physical address of the plurality of consecutive physical addresses and a first value of a flag;
read the at least the portion of the data from a second physical address of the plurality of consecutive physical addresses based at least in part on the first physical address and the first value of the flag;
transmit the data to the host device;
receive, from the host device, a second read command comprising a second logical block address associated with second data stored in the apparatus;
determine, based at least in part on the second logical block address, the memory location of the first plurality of entries that map the first plurality of logical block addresses to the corresponding first plurality of physical addresses, wherein the first plurality of logical block addresses comprises the second logical block address;

read, based at least in part on determining the memory location of the first plurality of entries and on the second logical block address, a second entry of the first plurality of entries, the second entry comprising a second physical address and a second value of the flag, wherein, based at least in part on the second value of the flag, the second physical address indicates a location of a second plurality of entries that map a subset of the first plurality of logical block addresses, comprising the second logical block address, to a corresponding subset of the first plurality of physical addresses;

identify, based at least in part on the second entry of the first plurality of entries, a first entry of the second plurality of entries, the first entry of the second plurality of entries comprising a fourth physical address indicating a location of the second data;

read the second data from the fourth physical address based at least in part on identifying the first entry of the second plurality of entries; and transmit the second data to the host device.

22. A non-transitory computer-readable medium storing code comprising instructions, which when executed by a processor of an electronic device, cause the electronic device to:
receive, from a host device, a read command comprising a first logical block address associated with a location of at least a portion of data stored in the electronic device, wherein the data spans a plurality of consecutive physical addresses;
determine, based at least in part on the first logical block address, a memory location of a first plurality of entries that map a first plurality of logical block addresses comprising the first logical block address to a corresponding first plurality of physical addresses;
read, based at least in part on the first logical block address, a first entry of the first plurality of entries, the first entry comprising a first physical address of the plurality of consecutive physical addresses and a first value of a flag;
read the at least the portion of the data from a second physical address of the plurality of consecutive physical addresses based at least in part on the first physical address and the first value of the flag;
transmit the data to the host device;
receive, from the host device, a second read command comprising a second logical block address associated with second data stored in the electronic device;
determine, based at least in part on the second logical block address, the memory location of the first plurality of entries that map the first plurality of logical block addresses to the corresponding first plurality of physical addresses, wherein the first plurality of logical block addresses comprises the second logical block address;
read, based at least in part on determining the memory location of the first plurality of entries and on the second logical block address, a second entry of the first plurality of entries, the second entry comprising a second physical address and a second value of the flag, wherein, based at least in part on the second value of the flag, the second physical address indicates a location of a second plurality of entries that map a subset of the first plurality of logical block addresses, comprising the second logical block address, to a corresponding subset of the first plurality of physical addresses;

identify, based at least in part on the second entry of the first plurality of entries, a first entry of the second plurality of entries, the first entry of the second plurality of entries comprising a fourth physical address indicating a location of the second data;

read the second data from the fourth physical address based at least in part on identifying the first entry of the second plurality of entries; and transmit the second data to the host device.

* * * * *